Figure 1:
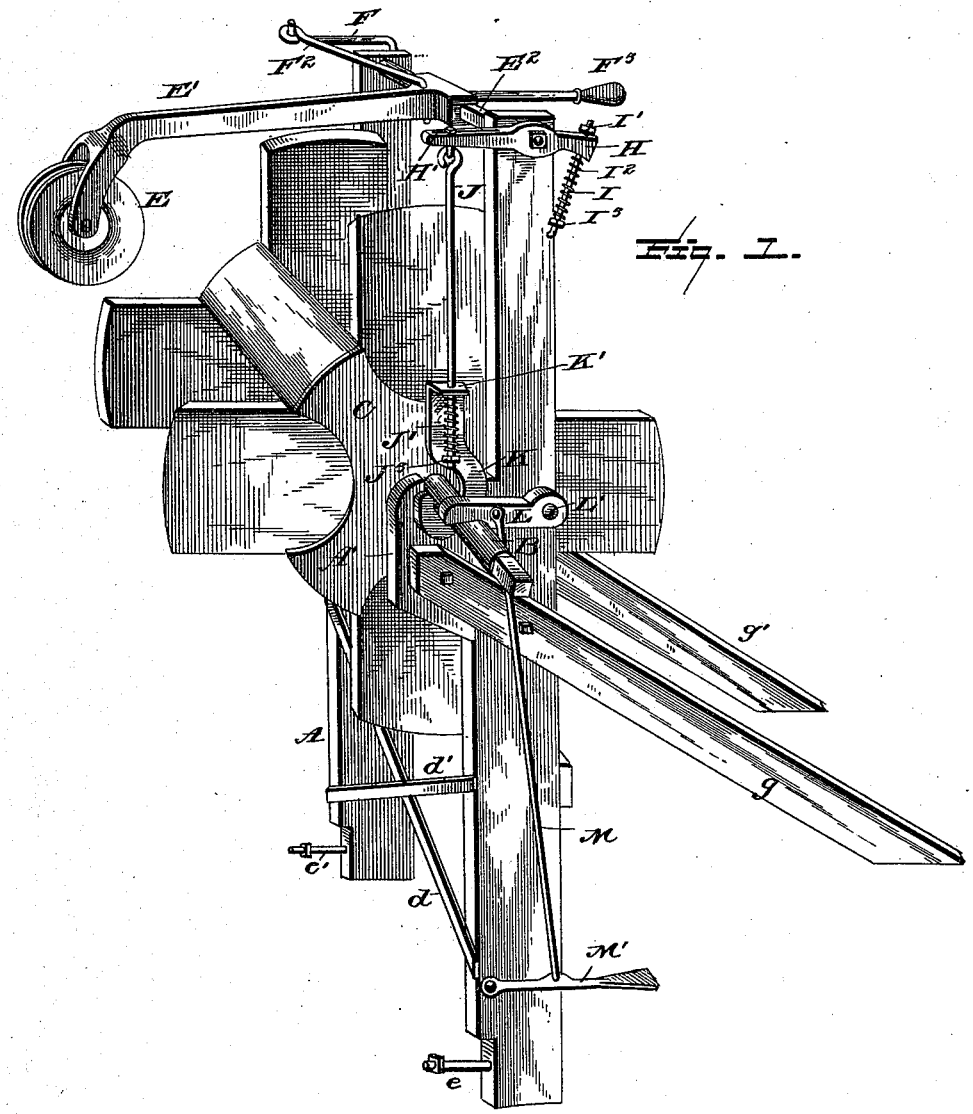

(No Model.)  2 Sheets—Sheet 1.

F. THEILENGERDES.
REEL FOR CHECK ROW PLANTERS.

No. 413,692. Patented Oct. 29, 1889.

Witnesses
L. C. Hills
H. Sutherland

Inventor
F. Theilengerdes
By E B Stocking

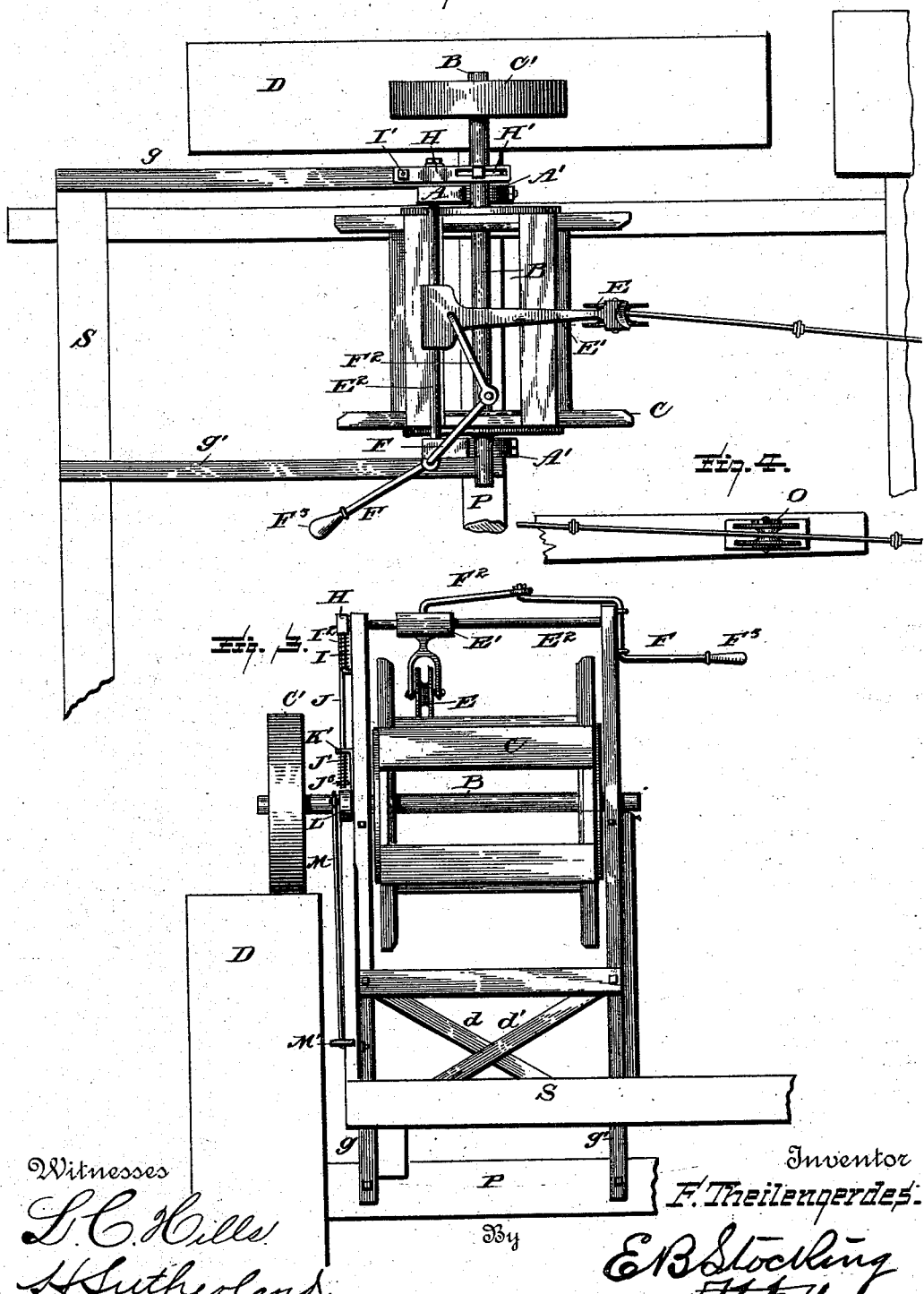

UNITED STATES PATENT OFFICE.

FREDERICK THEILENGERDES, OF MOUNT UNION, IOWA.

REEL FOR CHECK-ROW PLANTERS.

SPECIFICATION forming part of Letters Patent No. 413,692, dated October 29, 1889.

Application filed June 8, 1889. Serial No. 313,574. (No model.)

*To all whom it may concern:*

Be it known that I, FREDERICK THEILENGERDES, a citizen of the United States, residing at Mount Union, in the county of Henry, State of Iowa, have invented certain new and useful Improvements in Check-Row-Planter Reels, of which the following is a specification, reference being had therein to the accompanying drawings.

This invention has relation to certain improvements in reels for check-row planters, the main object of the invention being to provide a reel and its attachments by means of which the check-row wire may be wound and distributed evenly and smoothly upon the reel.

Another object is to pay out the wire in such a uniform manner that neither breakage nor bending will result.

Other objects and advantages of the invention will appear in the following description, and the novel features thereof will be particularly pointed out in the claims.

Referring to the drawings, Figure 1 is a perspective of a reel and its attachments constructed in accordance with my invention. Fig. 2 is a plan of the reel and attachments operatively connected to a planter-frame. Fig. 3 is an end elevation of the same, and Fig. 4 is a plan of the guide-pulley on the forward end of the shaft.

Like letters of reference indicate like parts in all the figures of the drawings.

Attached to the uprights A are the blocks A', recessed to form a bearing for the shaft B of the reel C. Upon the end of the shaft B is the friction-wheel C', which derives its motion from the planter-wheel D. The pulley E is journaled in the end of the guide E', which reciprocates freely on the shaft $E^2$. The lever F, fastened to the upright A, is hinged to the link $F^2$, which in turn is connected with the guide E'. By means of the handle $F^3$ the guide E' is reciprocated upon the shaft $E^2$ and the wire, which passes under the pulley E, is deposited evenly upon the reel.

The lever H is fulcrumed upon the end of the shaft $E^2$. One end of the rod I passes through the end of the lever H, and by means of the nut I' raises the lever, and through it and the shaft $E^2$ the guide E' and the pulley E. The other end is fastened to the upright A. The spring $I^2$ is compressed on the rod I between the nut $I^3$ and the lower side of the lever H, holding the lever up in any desired position.

The slot H' in the lever H is adapted to receive, through any suitable connection, one end of the rod J. The hook K, which raises the shaft B, is shouldered at K'. Through a perforation in this shoulder the rod J passes, and upon the lower end thereof is mounted the spring J', which is adjusted to any desired tension by the nut $J^3$.

The lever L is attached to the upright A by the pin L'. This lever is recessed at its end to bear against the shaft B to act as a brake. Near the center of the lever is fastened the rod M, the other end of which is fastened to the foot-lever M'.

The lower ends of the uprights A are fastened to the axle P of the planter by means of the bolts *e e'* or any other suitable fastening. The uprights A are rendered firm by the cross-pieces *d d'* and the braces *g g'*, which may be fastened to the beam S of the planter-frame.

On the forward end of the planter shaft or pole is the pulley O, over which the check-row wire passes in winding up the wire.

The operation is as follows: The check-row wire passes over the pulley O and under E and is wound upon the reel C, being distributed evenly thereon by the action of the guide E', operated by the lever F. When the wire becomes tightened, it raises the pulley E, guide E', lever H, rod J, hook K, and through them the shaft B and the friction-wheel C', thus allowing the friction-wheel and the reel C to stop rotating for the moment to prevent breakage of the wire. When the wire winds too loosely upon the reel, the friction-wheel is pressed tightly against the planter-wheel D by means of the foot-lever M', thus preventing any slipping of the friction-wheel. The tighter the wire is wound upon the reel the higher the guide E' and the pulley E are raised, the greater the weight of wire upon them, and the higher the friction-wheel is raised from the planter-wheel. When the wire is unwound from the reel, the friction-wheel may be taken off and laid in any convenient position on the planter-frame. By adjusting and tightening the nut $I^3$ the spring $I^2$ is shortened, the guide $E'$ and the pulley E raised, and the wire is wound tightly upon the reel. By loosening the nut the wire is wound more loosely upon the reel.

The guide $E'$ is preferably made with a T-head, bored for the reception of the shaft $E^2$.

What I claim is—

1. In a check-row-planter reel attachment, a tension-regulating device consisting of the oscillating shaft $E^2$, the guide $E'$ thereon carrying the wheel E at one end, the oscillating lever H, connected with said shaft, the rod I, connected with one arm of said lever with one end attached to some fixed part of the machine, the spring $I^2$ on said rod beneath the outer end of said lever, and the nuts $I'$ $I^3$ on said rod, substantially as specified.

2. In a check-row-planter attachment, the combination, with an upright, a lever F on said upright, and a horizontal link hinged thereto, of a shaft and a guide adapted to reciprocate freely upon said shaft and having one end of said link connected therewith, substantially as specified.

3. In a check-row-planter reel attachment, the combination, with a lever and a horizontal link hinged thereto, a guide, and a pulley journaled thereon, said guide being adapted to reciprocate freely upon a shaft journaled in two uprights, of a lever fastened to the end of said shaft and a tension-regulating device fastened to the upright and to the lever on said shaft, substantially as specified.

4. In a check-row-planter reel attachment, the combination, with the shaft $E^2$ and suitable supports therefor, the guide $E'$, free to move longitudinally on said shaft, the pulley E at the free end of said guide, the lever F, the draw-link $F^2$, connecting said lever and guide, the lever H on the extended end of said shaft, and the rod I, adjustably connecting one end of said lever with the support of the reel-shaft, the hook K, engaging the same, and the rod J, connecting the lever H with said hook, substantially as specified.

5. In a check-row-planter attachment, the combination, with the foot-lever $M'$, draw-link M, and brake L, of the shaft B, friction-wheel $C'$ on said shaft, planter-wheel D, revolving in contact with said friction-wheel, reel C, hook K, engaging the shaft B, nut $J^3$, spring $J'$, and rod J, substantially as specified.

6. In a check-row-planter reel attachment, the combination, with a guide mounted for oscillation at an angle to the reel, of connecting devices, substantially as described, extending from the guide to the reel-shaft and terminating in a hook supporting the shaft, and operating to raise said shaft by means of tension in the wire being reeled.

7. In a check-row-planter reel attachment, the combination of a guide mounted on the shaft and for oscillation at an angle to the reel, a lever secured to the guide-shaft to oscillate therewith and with the guide, and a rod extending from the lever and terminating in a hook arranged to embrace the reel-shaft, substantially as specified.

8. An oscillatory guide and its oscillating shaft provided with a slotted lever rigidly attached thereto, a connecting-rod adjustably secured in the slot of the lever and terminating in means for embracing the reel-shaft, substantially as specified.

In testimony whereof I affix my signature in presence of two witnesses.

FREDERICK THEILENGERDES.

Witnesses:
 DICK MEYER,
 JOHN HEMMEN.